United States Patent Office 3,223,289
Patented Dec. 14, 1965

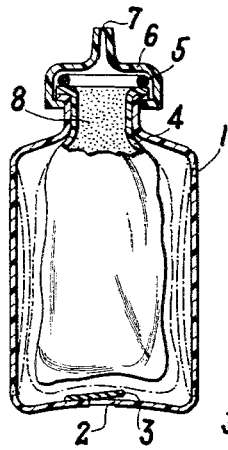
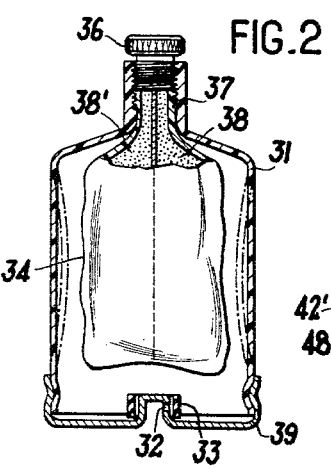
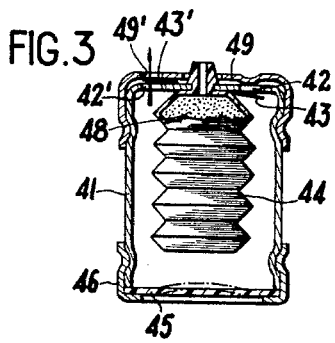
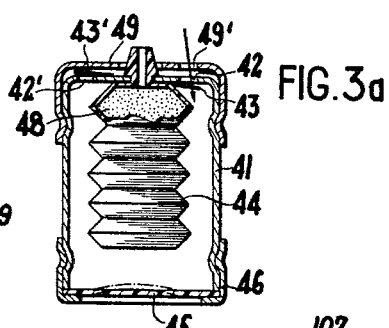
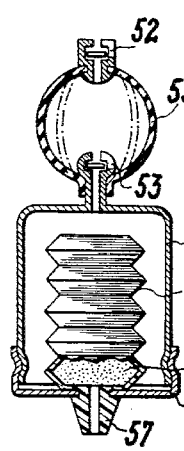
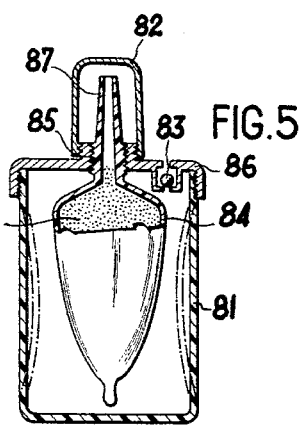
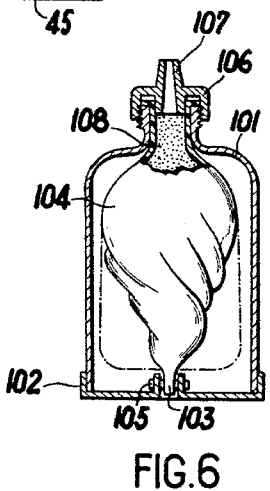
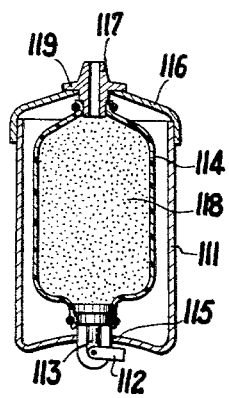
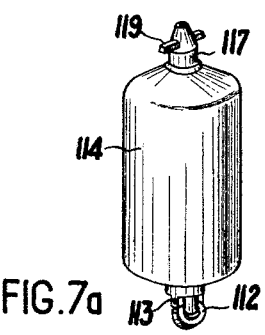

1

3,223,289
DISPENSING DEVICES
Bernard Bouet, 65 Rue La Boetie, Paris, France
Filed Apr. 30, 1962, Ser. No. 191,693
Claims priority, application France, Nov. 24, 1961,
880,033
2 Claims. (Cl. 222—209)

This invention relates to devices for dispensing flowable materials, such as liquids, pulps, pastes, powders and the like, including such products as food stuffs, pharmaceuticals, toothpaste, shaving cream, skin creams, cosmetics, and the like.

A widespread form of dispensing container for such materials is the squeezable tube. Devices have also been proposed, using plungers or the like, which are so designed that the outer appearance of the container remains unchanged as the contents are dispensed therefrom. Dispensing containers in the form of deformable tubes are extremely advantageous and economical when made from plastic sheet materials. However, such materials have disadvantages for the purpose contemplated because they cannot be made entirely free from elasticity or resiliency, and as a result when the tube has been squeezed and then the pressure relaxed, the walls tend to spring back a substantial amount, sucking in air into the tube to replace part of the material extruded therefrom. This makes further dispensing difficult, and moreover, the entry of air into the tube tends in many cases to impair the properties of the material by oxidation.

It is an object of this invention to provide a dispensing container or device for flowable materials, which may be readily made from various plastic sheet materials, and wherein despite the inherent resiliency of such materials the ingress of air into the container on relaxation of pressure thereon will be positively prevented. Another object is to provide improved dispensing containers for flowable materials which will not visibly change shape during use, and will keep the contents thereof at all times out of contact from the atmosphere; a further object is to provide such devices which will be selectively operable both for dispensing material and for introducing material into the device as for filling purposes, or for the metering of samples for example. Other objects will become apparent as the disclosure proceeds.

Dispensing devices according to the invention may take a wide variety of diverse forms and serve for many different applications, only some of which will be shown or mentioned. Broadly, the invention provides a container having a deformable wall therein to define two separate spaces, one of which is fillable with the material to be dispensed, the other with air. The said one space communicates with the exterior through a dispensing aperture, while the other space communicates with the exterior through a vent provided with a check-valve permitting unidirectional (normally inward) flow of air through the vent. Means are provided for deforming the deformable wall from outside the assembly to create a pressure difference between said one space and the exterior whereby to cause a (normally outward) flow of material through the dispensing aperture; while on cessation of said deformation air flows into said other space through the vent to restore pressure equilibrium on both sides of the deformable wall and thus positively prevent the entry of air into said one space through the dispensing aperture. In the accompanying drawings, given by way of illustration and example but not of limitation:

FIG. 1 is a simplified view mostly in vertical section

2 showing a first embodiment of an improved dispensing device according to the invention;
FIG. 2 shows a further embodiment adapted for dispensing two different materials simultaneously;
FIGS. 3 and 3a show an embodiment which is selectively operable to produce a flow of material into or out of the container in the two respective operating conditions shown;
FIG. 4 shows another embodiment using a bulb;
FIG. 5 illustrates a device operating similarly to that of FIG. 1 but constructed for ready replacement of the material-containing pouch therein to refill the device;
FIG. 6 illustrates another embodiment wherein the outer container is rigid and the inner container is deformable in torsion;
FIG. 7 shows a different construction of an embodiment similar to FIG. 6, having refill facilities; and
FIG. 7a is a perspective view of a refill cartridge suitable for use with the embodiment of FIG. 7.

In the embodiment shown in FIG. 1, there is provided a container 1 made of a suitable relatively stiff, resilient sheet material such as polyethylene, having a hole 2 formed in its bottom wall. Associated with the hole 2 is a simple form of check valve comprising a strip of stiff resilient material bonded at one end to the inner surface of the container and extending across the opening 2 so as to oppose the outflow of air through it from the inside of the container. Mounted within the container 1 is a flexible bag or pouch 4 made of highly flexible plastic material, such as thin-gauge polyethylene sheet, polyvinyl chloride, regenerated cellulose known as cellophane, and other suitable sheet materials. The bag or pouch 4 has its mouth opening extended out through the neck of the container 1 and the outer end periphery of the bag is attached to the top of the container by means of a resilient ring 5 applied thereover and firmly clamped in position by means of an outer cap or cover 6 having a base flange crimped around an outer flange of the container neck, as shown. Various other forms of closure means may be used. The cap 6 is formed with a dispensing outlet or nozzle 7. Thus the bag 4 is suspended inside the container 1 from the neck thereof, and the interior of the bag communicates with the exterior by way of the mouth opening of the bag and the outlet nozzle 7. On the other hand, the interior space of the container 1 outside the bag or pouch 4 is seen to communicate with the exterior by way of the valved bottom vent 2 only. The pouch 4 is filled with the material to be dispensed.

In operation, it will be readily understood that if pressure is exerted externally against the resilient side walls of the container 1, so as to push said walls inwardly as indicated by the chain lines in FIG. 1, the pressure is transmitted to the walls of the pouch 4 and an amount of the contents thereof is expelled out through the outlet 7. When the pressure is relaxed from the walls of the container 1, said walls resume their initial form shown in full lines, thereby drawing in some air through opening 2 via the check-valve 3 into the inner space of the container around the pouch 4. This ingress of air into the container around the pouch restores the pressure balance and prevents air from entering into the pouch through the outlet 7 as would otherwise occur on release of the pressure applied to the walls of the container.

In the embodiment illustrated in FIG. 2, there is provided a container having side walls 31 made of relatively stiff resilient plastic sheet material as previously described, and a bottom wall 39 bonded thereto and made of rigid metallic material. The bottom wall 39 has an inward projecting boss stamped in its center and formed with a lateral vent aperture 32 in the upstanding side wall of said boss; the boss is surrounded by a resilient annular member 33 constituting a check valve. Suspended from the neck of container 31 is a flexible pouch 34 formed with an internal partition defining two compartments 38 and 38' in the pouch for holding two different materials which are to be isolated from each other until the time they are dispensed. Both compartments 38 and 38' open outwardly into the upper end of the pouch 34 which is suitably bonded to the inner surface of the neck of the container 31. A screw plug 36 is provided for closing the container outlet, until such time as a dispensing operation is to be performed. The embodiment just described operates similarly to the one shown in FIG. 1 described above, except that the pressure on the container side walls 31 serves to expel a portion of both the materials filling the compartments 38 and 38' simultaneously.

In the embodiment shown in FIGS. 3 and 3a there is provided a generally cylindrical outer container having a cylindrical side wall 41 and a flat top wall both made of substantially rigid material such as metallic material, and a resilient bottom wall 45 extending across the open bottom end of the cylindrical container and retained in place by a bezel ring 46 or the like. Suspended within container 41 from the rigid top wall thereof is a flexible pouch which in this case is formed with accordion-like pleats as shown. The top of the pouch has an upstanding boss extending therefrom and formed with an axial opening communicating with the inside of the pouch. The boss has a restricted neck portion which is inserted through a central opening in the rigid top wall of container 41 to provide the means for suspending the pouch in the container. Also formed in the rigid top wall of the container 41 are two vent apertures 42 and 42', with which are associated two check-valves 43, 43', mounted in reverse relationship so that check-valve 43 permits inflow of air into the interior of container 41 through vent 42, while check-valve 43' permits outflow of air from container 41 through vent 42'. Mounted for rotation over the flat top wall of container 41 is a selector member 49 in the form of a flanged disk having a central opening rotatably fitting about the central boss projecting from the pouch 44 as earlier described and having an inner annular rib stamped into its flanged skirt portion, which rib engages an annular groove stamped into the outer surfaces of the container 41 to attach the selector member 49 rotatively to the container. The selector plate 49 has a vent hole 49' formed in its flat end wall at a position to register selectively with either vent opening 42 or 42' by suitable rotation of the selector plate.

With the selector plate 49 adjusted to bring its opening 49' into register with the vent 42 in the container 41 as shown in FIG. 3a, it will be noted that the top flange of the selector prevents the check-valve member 43' from being lifted off the vent 42' and said latter vent is therefore inoperative, whereas vent 42 registering with hole 49' in the selector 49 is operative. In this condition the system operates in a generally similar manner to the operation of the systems described above with reference to FIGS. 1 and 2; that is, pressure applied to diaphragm 45 is transmitted to the walls of pouch 44 and an amount of material 48 container therein is expelled through the central outlet. When the pressure is relaxed, air is drawn in through the registering vents 49'-42 to restore pressure equilibrium between the inside and outside of the pouch 44, so that no air is drawn into the pouch.

When on the other hand selector plate 49 is adjusted to bring its opening 49' into registry with vent 42' as shown in FIG. 3, this vent is operative while the other vent 42 is inoperative, it being in this position closed by an inwardly projecting boss stamped into a corresponding portion of the selector 49. In this condition, pressure exerted on the diaphragm 45 merely expels some air from the container 41 through the registering vents 42'-49', but such pressure is not transmitted to the walls of pouch 44 and no expulsion of material can result. However, on relieving the finger pressure applied to the diaphragm 45, a suction is created within the pouch 44, so that material 48 can be drawn into the pouch from an outside supply. If the selector member 49 is turned to an intermediate position in which both vents 42 and 42' are inoperative, air can neither enter nor leave the container 41, and material can neither be discharged or introduced into pouch 44.

The embodiment shown in FIG. 4 comprises a generally cylindrical container 51 with substantially rigid side and end walls. One end wall, the lower one in the drawing, is formed by a flanged disk 56 attached over the open end of the cylindrical container body 51. Protruding through a central aperture in said disk 56 is a perforate end boss 57 of an accordion-pleated pouch 54, the arrangement being similar to that used in FIG. 3. The opposite or top end wall of container 51 is formed with a central apertured extension the outer end of which has a rounded head with a check-valve 53 seated within the head. As shown, a pressure bulb 55 made of resilient material is engageable over the knob-like head of the extension, and is formed with a vent opening in its end opposite from that engageable with the container, there being provided a check valve 52 in said vent opening. This embodiment may be provided in either of two alternative arrangements, respectively usable for filling the pouch 54 with material 58, and for dispensing said material out of the device. In the arrangement used for filling the container as shown, the check valve 52 is arranged to prevent the inflow of air from the exterior into the bulb, whereas the check valve 53 is arranged to prevent the outflow of air from the bulb into the container. With this arrangement, pressure exerted on bulb 55 expels air out of the bulb 55 through check valve 52 to the atmosphere, and when the pressure on the bulb is thereafter released a corresponding amount of air is drawn out of the interior of container 51 into the bulb. This creates a relative suction within the pouch 54 and material can be drawn into the pouch through the nozzle 57. With the alternative, arrangement, the two check valves act in reverse from what has just been described. Pressure on the bulb discharges air from the bulb through check-valve 53 into the container 51, discharging some material from the pouch 54 through the nozzle 57. On relaxing the pressure on the bulb, an amount of air is drawn into the container through the check valve 53 to restore the balance of pressures between the inside and outside of pouch 54 as earlier described.

FIG. 5 shows another construction of a dispensing device according to the invention, including an outer cylindrical container 81 having resiliently deformable side walls, sealed at one end integrally and sealed at its other or top end by a screwed-on cover plate 86. This plate is formed with a central boss 85 which is screw-threaded externally to receive a protective cap 82 and is also screw-threaded internally. A replaceable inner container includes a flexible pouch portion 84 and an upwardly projecting nozzle portion 87 which has a screw-threaded neck engaging the inner thread of boss 85 to suspend the pouch 84 from the top of the container 81, the nozzle 87 extending up into the protective cap 82. The top cover plate 86 is further formed with a vent orifice provided with a check velve 83 therein opposing the outflow of air from the container. In this construction the check valve 83 is shown as a ball-type valve. The inner pouch 84 is filled with material 88 to be dispensed, and pressure on the side walls 81 of the container after removal of screw cap 82 extrudes an amount of the material through nozzle 87, whereas on relaxing the pressure on the side walls, air enters the container through check valve 83 to restore the pressure balance and prevent entry of air into the pouch 84 to contact the extruded material 88, just as in the embodiment of FIG. 1. To re-fill the device, screw cover 86 is removed, and the exhausted inner pouch 84 is unscrewed and replaced by a full pouch.

In the embodiment shown in FIG. 6, there is a rigid outer container 101 of generally cylindrical shape having an open bottom and having a central neck opening at its top. A flexible pouch or bag 104 has its open upper end extending up into the neck opening and clamped therein by means of a screw cap 106 formed with a nozzle 107, the arrangement here being somewhat similar to that in FIG. 1. The open bottom of the container 101 is sealed by an end plate 102 which is mounted for frictional rotation relative to the container 101. The sealed lower end 103 of the bag 104 is fixedly clamped between a pair of lugs 105 upstanding from the center of the end plate 102, so that when rotation is imparted to said end plate relative to the container, the bag 104 will be twisted as indicated in the drawing. Friction between the end flange 102 and the container wall opposes rotation of the plate and backing of the bag 104 from its twisted position. Also the spacing between the open and sealed ends of the flexible pouch 104 remains constant throughout dispensing operations. If desired, friction-increasing such as serrations means may be provided between the flange of end plate 102 and the side wall of the container to more positively to oppose backing of the bag and the end plate. In this embodiment it will be noted that in contrast to the previousy described embodiments, a deformation is extered directly to the walls of the inner flexible container rather than having such deformation transmited thereto from the deformable wall of the outer container. After the end plate has been turned and the inner bag twisted to expel more substance out of the bag, the requisite amount of air enters into the outer container by leakage or through a vent, not shown, to restore the pressure balance between the interior and exterior of the deformed inner bag and thus prevent the ingress of air into the bag, just as in the other embodiments of this invention, even though no check valve need here be provided.

The embodiment shown in FIGS. 7 and 7a is generally similar to the embodiment last described. It comprises a substantially rigid outer container 111 having an open outer end provided with a rotatable end plate 116. The flexible inner bag 114 containing material to be dispensed has attached to its upper end a rigid apertured end piece 117 providing a discharge outlet and projecting through a central hole formed in rotatable end plate 116, relative rotation between end piece 117 and plate 116 being prevented as by a pair of side projections 119 engageable with complementary recesses in the end plate. The sealed lower end of the bag 118 is similarly non-rotatably connected with the base of the container 111, by having an end piece 113 projecting from the bag 114 through a non-circular opening or slot 115 in the bottom of the container. The protruding part of end piece 113 has a clevis ring 112 pivoted to its as shown. The device operates in a manner similar to that of FIG. 6, by imparting relative rotation between container 111 and end plate 116 to twist the inner bag 118 and expel some of its contents out of the nozzle 117. However, the construction shown in FIGS. 7 and 7a has the advantage of providing a readily replaceable refill cartridge constituted by the assembly including filled deformable bag 114 with its end pieces 113 and 117, as shown in FIG. 7a. The insertion of this refill cartridge into the outer container 111 is readily effected by inserting the end pieces 113 and 117 into the associated end openings in the container in the manner of a bayonet joint.

Various embodiments other than those shown, and different applications and uses of the invention may be conceived within the scope of the following claims.

What I claim is:

1. A dispensing assembly comprising a container; a deformable wall within the container defining two separate spaces therein, one of said spaces being fillable with said material; a dispensing aperture connecting said one space with the exterior; means operable from the exterior of said assembly for deforming said deformable wall; first and second vents connecting the other space with the exterior; a check valve associated with the first vent to oppose outward air flow therethrough and a check valve associated with the second vent to oppose inward air flow therethrough; and means selectively operable to disable said first vent whereupon operation of said wall deforming means will permit the dispensing of material from the exterior into said one space, and to disable said second vent whereupon operation of said wall deforming means will permit the dispensing of material from said one space to the exterior.

2. The assembly claimed in claim 1, wherein said selectively operable means comprises a flange connected for selective rotation relative to said container and overlying said vents.

References Cited by the Examiner

UNITED STATES PATENTS

| | | | |
|---|---|---|---|
| 654,235 | 7/1900 | Dow | 222—383 |
| 762,299 | 6/1904 | Fulton | 222—206 |
| 1,336,730 | 4/1920 | Court | 128—216 |
| 1,491,860 | 4/1924 | Holden | 222—104 |
| 1,631,931 | 6/1927 | Geake | 222—104 |
| 2,557,120 | 6/1951 | Knoblock | 222—95 X |
| 2,575,632 | 11/1951 | Lipman | 222—383 |
| 2,743,038 | 4/1956 | Ferris | 222—209 |
| 2,769,444 | 11/1956 | Henderson | 128—216 |
| 2,777,612 | 1/1957 | Bensen | 222—209 |
| 2,804,995 | 9/1957 | Fee | 222—95 |
| 2,944,705 | 7/1960 | Strumor | 222—94 |

LOUIS J. DEMBO, *Primary Examiner.*

EVERETT W. KIRBY, *Examiner.*